Patented July 26, 1949

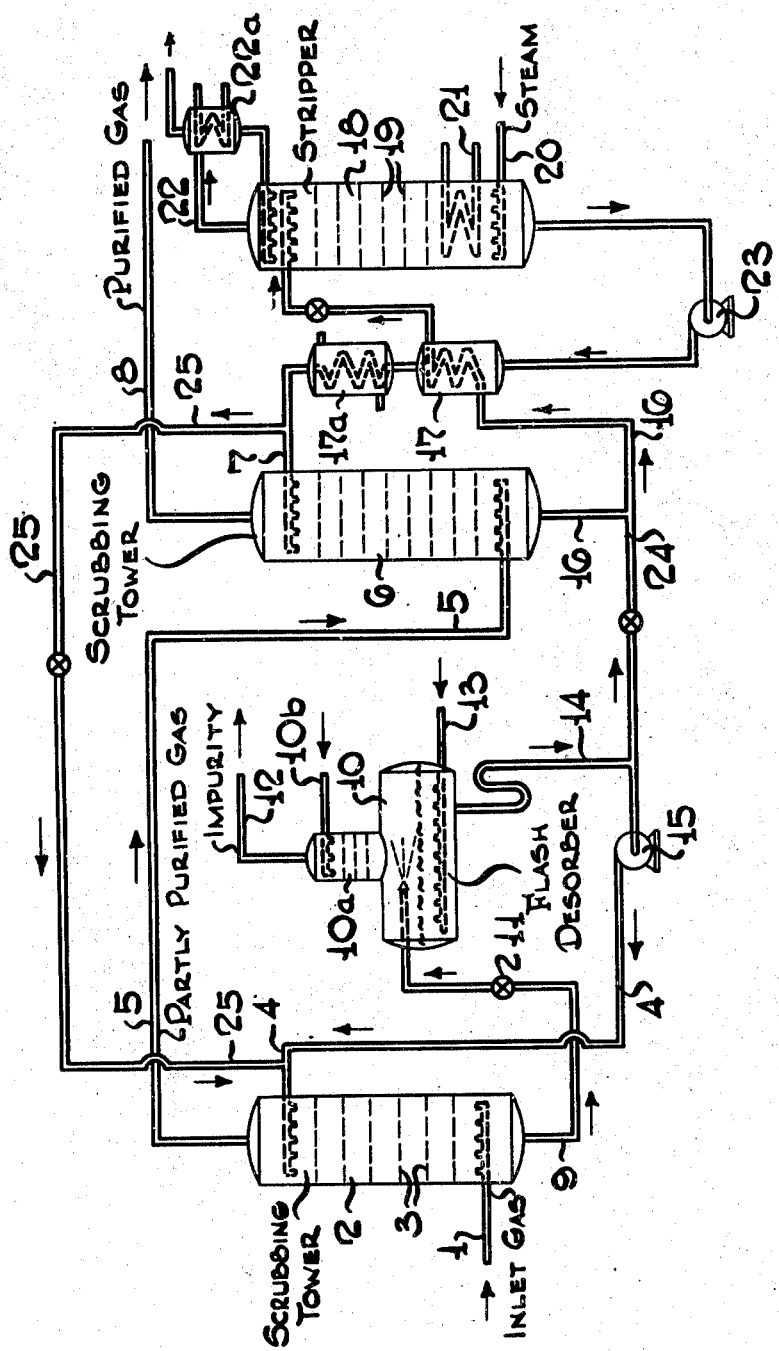
Walter G. Scharmann Inventor

2,477,314

UNITED STATES PATENT OFFICE 2,477,314

PROCESS FOR PURIFYING GASES

Walter G. Scharmann, Westfield, N. J., assignor to Standard Oil Development Company, a corporation of Delaware Application November 27, 1945, Serial No. 631,147

3 Claims. (Cl. 23—2)

The present invention relates to improvements in the process of removing weakly acid impurities from industrial gases and more specifically to process of removing impurities such as carbon dioxide and hydrogen sulfide and the like from gases containing the same. The process will be understood from the following description and drawing.

The drawing is a diagrammatic view in sectional elevation of an apparatus for purifying gases according to the present method, indicating the flow of the gas and that of the purifying solution.

There are many solvents for purifying gas mixtures by removal of weakly acid constituents such as carbon dioxide, hydrogen sulfide and the like, and the processes are reasonably cheap and quite satisfactory where the amount of the impurity to be removed is not large. One of the chief costs in these various processes lies in the regeneration of the absorption liquid. In these processes the absorbed impurities are driven off of the solvent in a second or regeneration stage by the application of heat and the process thus requires that the total bulk of the solvent be raised from the absorption temperature, which is of the order of room temperature to 150° F. up to 220° to 300° F. for desorption and steam provided for stripping. It is true that much of this heat can be recovered by heat exchange equipment but this is expensive and there is an inevitable loss and where large amounts of solvent are required the cost of the process becomes prohibitively great.

One object of the present invention is to devise a method for application to gas mixtures in which the impurities may be as much as 40 or 60% of the initial gas. Another object is to devise a method for removing a large part of the impurity by a cheaper method, reducing the amount of the impurity in the gas down to a value at which it can then be handled by conventional methods at reasonable cost. Other objects will be apparent to those skilled in the art.

Referring to the drawing, numeral 1 denotes a feed line through which the impure gas containing carbon dioxide, hydrogen sulfide or other similar weakly acid gases are fed to the system under a pressure in excess of atmospheric. The gas is delivered to the bottom of a scrubbing tower 2 which is fitted with contact packing generally shown at 3 and which may consist of bellcap plates, rings or other means of obtaining intimate contact between downwardly flowing liquid and the upwardly flowing gas. As the gas rises through the tower 2, the impurities are dissolved in the purifying liquid which is introduced at the top of the tower by the pipe 4. The partially purified gas leaves the top of the tower by the pipe 5 which conducts it to a secondary scrubbing tower 6. This tower may be in all respects similar to tower 2, being provided with packing and fed at the top with a purifying solution through pipe 7. The completely purified gas leaves by the pipe 8.

From the bottom of the tower 2 the rich or spent solution is taken by means of the pipe 9 directly to a flash desorption or flash chamber 10 without intermediate heating, with, however, a substantial reduction of pressure, preferably down to atmospheric, at the throttle valve 11. The flash desorption may be of various designs but consists of a simple open drum to provide the disengaging space for the dissolved impurities and preferably surmounted by a tower or dome 10a which is fed with make-up water at 10b and acts as a mist extractor on the gaseous impurities as they leave thru pipe 12 and are discarded.

From the lower part of tower 6 the second purifying solution is conducted by a pipe 16 to a heat exchanger 17 and thence to the top of a conventional stripping tower 18 which, unlike 10, is fitted with the usual contact devices such as bellcap plates or packing and indicated generally at 19. The solution flows through the tower and is stripped of the impurities by rising steam which may be admitted by the open coil 20 or may be generated by vaporization of a part of the water from the solvent solution by means of the closed heating coil 21.

The impurities thus stripped from the solution in the tower 18 are conducted away by the pipe 22, to a condenser 22a which returns condensed steam to the tower while the solution is forced by a pump 23 through the heat exchanger 17, cooler 17a, and thence by pipe 7 to the secondary scrubbing tower 6, just as mentioned before. A small portion of the solution from the pipe 14 may be passed to pipe 16 by the line 24 or, if desired, a small amount of the solution from pipe 7 may be pumped to pipe 4 by means of the pipe 25. These by-pass lines are employed if the same solution is used in both the primary and secondary systems, in order to keep the two in balance but are not required.

As indicated before, the first stage of the present process is mainly adapted to the treatment of gas mixtures containing large percentages of impurities and a substantial removal of these impurities can be obtained very cheaply by the present system, although it has a drawback in that the first stage does not produce a gas of the high purity often required in industrial work and if high purity is required, the second converter stage of gas purification must be included. It is possible, however, in most cases to reduce the amount of the impurities by the first stage of the present system so sharply that a conventional system can be used economically for final purification of the gas and substantial economies can be obtained by this combination. The process is also particularly adapted to the purification of gases which are under high pressures so that the initial stage of absorption and the initial flash desorption can be operated at substantially different pressures, the absorption being at the higher pressure and the desorption being at substantially atmospheric pressure. It is possible, however, to operate both at the same total pressure, if desired, by reducing the partial pressure of the absorbed impurities in the desorber by the injection of a substantial volume of inert gas into this desorber by which partial pressure of the desorbed gas is considerably reduced and is therefore lower than its partial pressure in the absorber. This is accomplished by introducing the inert gas by means of line 13.

In the operation of the present process, the absorption may be accomplished by any of the common solvents now used such as, for example, mono-, di- or triethanolamine, potassium phosphate, sodium carbonate, sodium phenate or chlorphenate, amino propanol or other such solvents. All of them at present are employed in the same manner, being capable of absorbing large volumes of weakly acid constituents at low temperature and desorbing them at a higher temperature. In the present process the absorption tower is ordinarily operated at a considerable superatmospheric pressure and the solution is fed at a temperature, preferably, not over 100° F. During its passage through the absorber tower, the temperature rises due to the heat of solution and the value attained will be from say 100° to 130° F. or thereabout, depending on the initial temperature and the amount of impurity absorbed. On its removal from the tower, the solution will be saturated with the impurities under the partial pressure prevailing at the point of its exit from the absorber tower. When the pressure is released on discharge into the desorber to atmospheric pressure, the absorbed impurities are immediately released, but since no heat is added to the solution it will not rise in temperature according to the ordinary or previous practice but the temperature will fall slightly to 100° or somewhat lower. The desorbed solvent will be saturated with the impurities at the partial pressure of the flash tower, which will ordinarily be one atmosphere, unless additional inert gas has been added but at this strength it can be recirculated directly to the absorber tower where it is capable of dissolving more impurities under the higher conditions of partial pressure. It should be noted that the purification obtained in the absorber is such that the percent of the impurity in the outlet gas will approach and is theoretically equal to $$\frac{100}{P_t}$$

where $P_t$, the total pressure is given in atmospheres. The actual purification will be, of course, somewhat lower than this. As an example of what is intended, it will be noted that if the original gas contained 50% $CO_2$ and is under 20 atmospheres pressure, the limit of purification obtained in this stage is about 95% of the $CO_2$ and the product gas will contain 5% $CO_2$ on the assumption that the desorber is operated at atmospheric pressure.

With the present process it is therefore possible to very cheaply remove a large amount of the impurities from a high pressure gas.

The amount of the liquid circulated through the absorption towers can be readily calculated by those skilled in this art. It is merely necessary to know the absorption capacity of the particular solution under particular temperature and pressure conditions. The amount of the liquid theoretically required is given by the following equation:

$$G = \frac{I}{S_p - S_1}$$

where $G$ is the gallons of solvent per thousand cubic feet of gas; $I$ is the amount (C. F.) of the impurity to be removed per thousand cubic feet of gas; $S_p$ is the solubility of the particular solvent at the pressure and temperature of the exit of the absorption tower in cubic feet per gallon and $-S_1$ is the solubility in the same solution at atmospheric pressure and the temperature of the desorber.

It will be observed that in the present operation, the initial stage of the process consisting of the initial absorption and desorption are operated under what may be termed adiabatic conditions. In other words, no heat is extracted during the solution and no heat is added during the desorption. In this way great savings can be made and nevertheless a large amount of the impurities of the gas may be removed. It is to be emphasized that the rich solution is directly discharged into the desorption zone by which it is meant at approximately the temperature obtained in absorption and without the addition of heat. Actually in practice the flash zone temperature will approximate that of the absorber but it is usually from 10 to 50° F. lower, in sharp contrast to the operations of the conventional type.

The secondary purification system disclosed herein consists of the conventional method applied to the partially purified gas produced in the initial step. It consists of an absorption of the impurities from the partially purified gas at normal temperature and the desorption at a more elevated temperature. In this manner a gas of high purity can be produced. It will be noted that the latter stage of the process is not adiabatic and is thus distinguished from the initial stage.

If desired the same substance, that is to say the same solution, may be used in both of the absorption stages but solutions of different concentrations or different substances may be employed, for example, triethanolamine may be used in the first stages of the absorption whereas sodium phenate might be used in the second stage or vice versa.

To more fully understand the application of the present process to practical purification problems, the following examples of proposed operations are given:

Example

In a large plant handling many million of cubic feet of gas per day, the inlet gas contains 17% $CO_2$ and is at a pressure of 300 pounds per square inch. The first purified solution containing about 25% aqueous monoethanolamine is fed at the rate of 0.91 gallon per cubic feet of $CO_2$ to be absorbed. At equilibrium after the process has been operating for some time, the solution enters the scrubber at 100° F. and contains about 8.1 cubic feet of $CO_2$ in each gallon. It leaves the first scrubber at 111° F. and contains about 9.2 cubic feet per gallon. The exit or partially purified gas contains 5.9% $CO_2$.

The flash desorber is operated at atmospheric pressure adiabatically, that is to say, without any additional heat after absorption, the charged solution being released from the higher pressure at 111° F. and discharged to the lower pressure where the temperature attained is 100° F. Sufficient $CO_2$ is thus released to bring the content of the solution down to 8.1 cubic feet per gallon as mentioned above.

In the secondary purification which is conducted according to conventional methods, the partially purified gas containing 5.9% $CO_2$ is scrubbed with a solution similar to that used in the first but the amount required is only about 10% of that in the first circulation system. By this means the gas is purified to the point where it contains less than .1% $CO_2$.

In studying the above operation, it should be noted that about two-thirds of the $CO_2$ removed is taken out in the first stage of the process. At current costs the equipment for the first stage desorption according to the present invention would cost only about one-half of that required for the second stage. If a plant were designed to operate throughout according to conventional methods, the cost of desorption would be over twice as great as the cost of that feature of the two stages of the present process as shown. Operating costs are also substantially lower for the present combination, being chiefly based on the smaller amount of heat required.

I claim:

1. An improved process for removing weak acidic constituent impurities from gas mixtures containing the same which comprises scrubbing a high pressure gas containing the impurities with a solvent for such impurities in an initial absorption zone, at a superatmospheric pressure, withdrawing a partially purified gas from said initial absorption zone and passing the same to a secondary absorption zone, withdrawing the solvent from said initial absorption zone, and suddenly reducing the pressure to about atmospheric pressure on said solvent as it is passed into a flash desorption zone, whereby flashing of absorbed constituents from the solvent results, withdrawing the solvent from said flash desorption zone and splitting the same into a larger proportion and into a smaller proportion, compressing said larger proportion of said solvent and directly returning the same to said initial absorption zone, scrubbing said partially purified gas a second time with the solvent in a secondary absorption zone, withdrawing purified gas from said secondary absorption zone, withdrawing the solvent from said secondary absorption zone and combining the withdrawn solvent with said smaller proportion of solvent segregated from said flash desorption zone, heating the combined solvent streams in a secondary desorption zone and releasing the impurities therefrom, removing the solvent from said secondary desorption zone, cooling the same and returning a major proportion of said cooled solvent to said secondary absorption zone combining the minor proportion of said cooled solvent with said larger proportion of solvent removed from said flash desorption zone and returning the combined streams to said initial absorption zone.

2. Process as defined by claim 1 wherein the smaller proportion of solvent removed from said flash desorption zone is substantially equivalent to said minor proportion of solvent removed from said secondary desorption zone.

3. Process as defined by claim 1 wherein said solvent comprises an aqueous solvent and wherein water is lost in said flash desorption zone and wherein make-up water is added to the top of said flash desorption zone.

WALTER G. SCHARMANN.

REFERENCES CITED

The following references are of record in the file of this patent:

UNITED STATES PATENTS

| Number | Name | Date |
|---|---|---|
| 2,033,933 | Goodwin et al. | Mar. 17, 1936 |
| 2,134,507 | Cooke | Oct. 25, 1938 |
| 2,162,838 | Cole et al. | June 20, 1939 |
| 2,242,323 | Powell | May 20, 1941 |
| 2,318,522 | Powell | May 4, 1943 |